(12) United States Patent
Yeh

(10) Patent No.: US 9,146,805 B2
(45) Date of Patent: Sep. 29, 2015

(54) DATA PROTECTING METHOD, MEMORY STORAGE DEVICE, AND MEMORY CONTROLLER

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 112 days.

(21) Appl. No.: 14/038,778

(22) Filed: Sep. 27, 2013

(65) Prior Publication Data

US 2015/0012799 A1    Jan. 8, 2015

(30) Foreign Application Priority Data

Jul. 8, 2013  (TW) .............................. 102124432 A

(51) Int. Cl.
*G11C 29/00* (2006.01)
*G06F 11/10* (2006.01)

(52) U.S. Cl.
CPC ....................................... *G06F 11/10* (2013.01)

(58) Field of Classification Search
CPC . G06F 11/10; G06F 11/1048; G06F 12/0646; G06F 3/0631; G06F 3/0679; G06F 11/1068; G06F 12/0207; G06F 3/0608; G06F 11/1012; G06F 11/1072; G11C 29/16; G11C 16/04; G11C 2029/0401; G11C 16/0483; G11C 11/5628; H03M 13/29; H03M 13/2906
See application file for complete search history.

(56) References Cited

U.S. PATENT DOCUMENTS

| | | | |
|---|---|---|---|
| 4,747,080 A * | 5/1988 | Yamada | 365/200 |
| 6,236,602 B1 * | 5/2001 | Patti | 365/201 |
| 8,276,033 B2 * | 9/2012 | Tseng et al. | 714/746 |
| 8,341,498 B2 * | 12/2012 | D'Abreu et al. | 714/766 |
| 8,381,066 B2 * | 2/2013 | Yamaga | 714/755 |
| 2001/0048625 A1 * | 12/2001 | Patti et al. | 365/201 |
| 2004/0004856 A1 * | 1/2004 | Sakimura et al. | 365/158 |
| 2005/0281112 A1 * | 12/2005 | Ito et al. | 365/222 |
| 2010/0039858 A1 * | 2/2010 | Maccarrone et al. | 365/185.03 |
| 2010/0241914 A1 * | 9/2010 | Chen et al. | 714/718 |
| 2011/0154162 A1 * | 6/2011 | Tseng et al. | 714/773 |
| 2012/0075905 A1 * | 3/2012 | Iwanari et al. | 365/145 |
| 2013/0039129 A1 * | 2/2013 | Radke et al. | 365/185.09 |

FOREIGN PATENT DOCUMENTS

TW           200519595        6/2005

OTHER PUBLICATIONS

"Office Action of Taiwan Counterpart Application", issued on Mar. 20, 2015, p.1-p.7, in which the listed reference was cited.

* cited by examiner

*Primary Examiner* — Guerrier Merant
(74) *Attorney, Agent, or Firm* — Jianq Chyun IP Office

(57) ABSTRACT

A data protecting method, a memory storage device, and a memory controller are provided for a rewritable non-volatile memory module. The data protecting method includes: generating a first error correcting code by using data stored in first memory cells of a plurality of memory cells. The first memory cells are located on first word lines and first bit lines. Among the memory cells located on each of the first bit lines, only one of the memory cells stores the data used to generate the first error correcting code. Accordingly, the data in the memory cells is efficiently protected.

24 Claims, 9 Drawing Sheets

DATA PROTECTING METHOD, MEMORY STORAGE DEVICE, AND MEMORY CONTROLLER

CROSS-REFERENCE TO RELATED APPLICATION

This application claims the priority benefit of Taiwan application serial no. 102124432, filed on Jul. 8, 2013. The entirety of the above-mentioned patent application is hereby incorporated by reference herein and made a part of this specification.

BACKGROUND

1. Technology Field

The present invention generally relates to a data protecting method, in particular, to a data protecting method for a rewritable non-volatile memory module, a memory storage device, and a memory controller.

2. Description of Related Art

Due to the rapid developments of digital cameras, cellular phones, and MP3 players in recent years, consumer demand for storage media has rapid increased as well. The characteristics of data non-volatility, low power consumption, compact size, and lack of mechanical structure make the rewritable non-volatile memory module (for instance, a flash memory) ideal for being built in the portable multi-media devices as cited above.

In general, a rewritable non-volatile memory module includes a plurality of physical blocks, wherein each of the physical blocks includes a plurality of memory cells and each of the memory cells is located on a bit line and a word line. Memory cells on the same word line form one or a plurality of physical pages, and the physical pages can be divided into lower physical pages and upper physical pages. The lower physical pages need to be programmed first before the upper physical pages can be programmed. Therefore, if data is stored in the lower physical pages and a programming error occurs when programming the upper physical pages located on the same word line, then an error may also occur to the data stored in the lower physical pages. One solution is to use an error correcting code to protect the data to which an error may occur. However, when a programming error occurs to a memory cell, the programming error may also affect the other memory cells on the same bit line. In other words, the data may need to be protected by a plurality of error correcting codes. Therefore, how to effectively use an error correcting code to protect data in memory cells is an important issue for those skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a data protecting method, a memory storage device, and a memory controller. The data protecting method, the memory storage device, and the memory controller can effectively protect the data in a rewritable non-volatile memory module.

An exemplary embodiment of the present invention provides a data protecting method for controlling a rewritable non-volatile memory module. The rewritable non-volatile memory module includes word lines, bit lines, and a plurality of memory cells. Each of the memory cells is located on one of the word lines and one of the bit lines, and the memory cells form a plurality of physical erasing units. The data protecting method includes: generating a first error correcting code by using data stored in first memory cells of the memory cells. The first memory cells are located on first word lines and first bit lines. Among the memory cells located on each of the first bit lines, only one of the memory cells stores the data used to generate the first error correcting code.

An exemplary embodiment of the present invention provides a memory storage device. The memory storage device includes a connector, a rewritable non-volatile memory module, and a memory controller. The connector is configured to be coupled to a host system. The rewritable non-volatile memory module includes word lines, bit lines, and a plurality of memory cells. Each of the memory cells is located on one of the word lines and one of the bit lines, and the memory cells form a plurality of physical erasing units. The memory controller is coupled to the connector and the rewritable non-volatile memory module, and is configured to generate a first error correcting code by using data stored in first memory cells of the memory cells. The first memory cells are located on first word lines and first bit lines. Among the memory cells located on each of the first bit lines, only one of the memory cells stores the data used to generate the first error correcting code.

An exemplary embodiment of the present invention provides a memory controller. The memory controller is configured to control the rewritable non-volatile memory module. The memory controller includes a host interface, a memory interface, and an error checking and correcting circuit. The host interface is configured to be coupled to a host system. The memory interface is configured to be coupled to the rewritable non-volatile memory module. The error checking and correcting circuit is configured to generate a first error correcting code by using data stored in first memory cells of the memory cells. The first memory cells are located on first word lines and first bit lines. Among the memory cells located on each of the first bit lines, only one of the memory cells stores the data used to generate the first error correcting code.

Based on the above, the data protecting method, the memory storage device, and the memory controller provided by the exemplary embodiments of the present invention generate an error correcting code according to data stored in memory cells located on different bit lines and different word lines. As a result, data can be more effectively protected.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
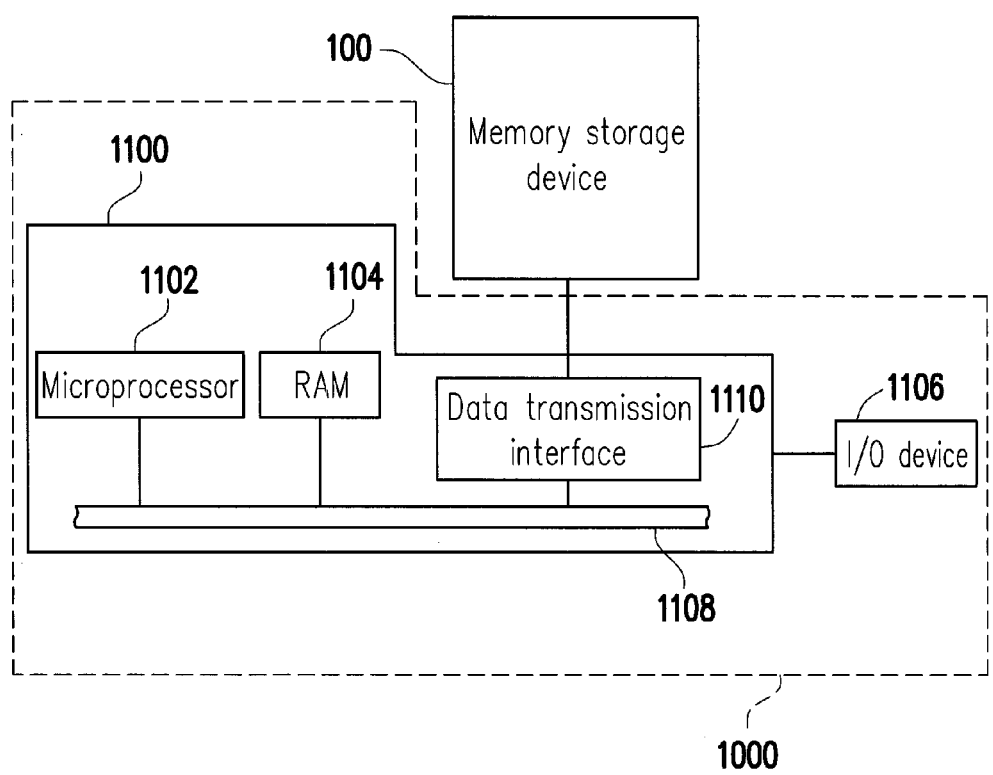
FIG. 1A is a host system and a memory storage device illustrated according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (also referred to as a memory storage system) includes a rewritable non-volatile memory module and a controller (also referred to as a control circuit). The memory storage device is usually used with a host system, such that the host system can write data into or read data from the memory storage device.

FIG. 1A is a host system and a memory storage device illustrated according to an exemplary embodiment.

Figure 1B:
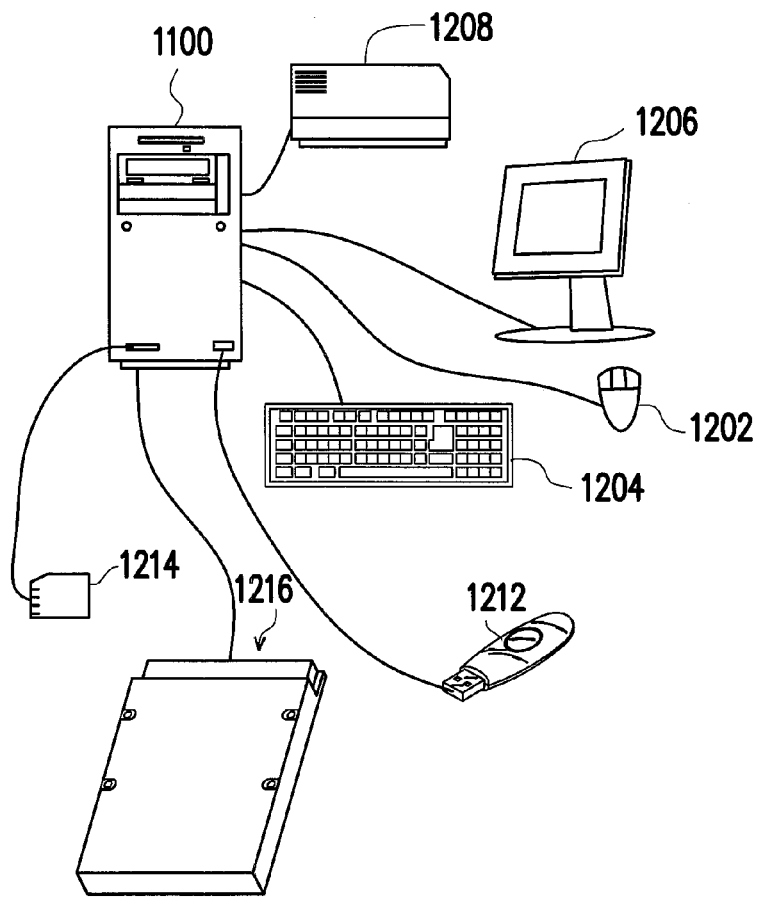
FIG. 1B is a schematic diagram of a computer, an input/output device, and a memory storage device illustrated according to an exemplary embodiment.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1702, a keyboard 1704, a display 1706, and a printer 1208 as shown in FIG. 1B. It should be understood that the devices illustrated in FIG. 1B are not intended to limit the I/O device 1106, and the I/O device 1106 can further include other devices.

In an embodiment of the present invention, a memory storage device 100 is coupled to the other devices of the host system 1000 through the data transmission interface 1110. Through the operation of the microprocessor 1102, the RAM 1104, and the I/O device 1106, data can be written into or read from the memory storage device 100. For instance, the memory storage device 100 can be a rewritable non-volatile memory storage device such as a flash drive 1212, a memory card 1214, or a solid state drive (SSD) 1216 as shown in FIG. 1B.

Figure 1C:
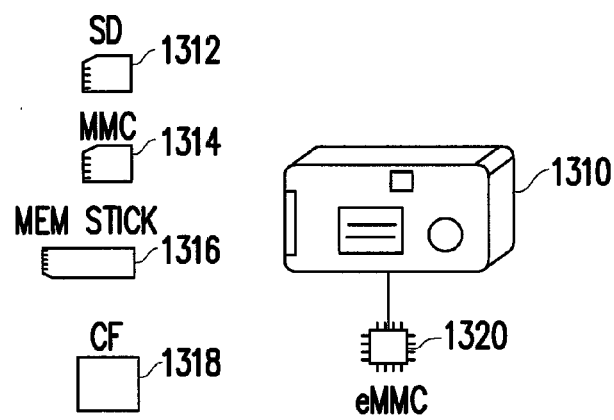
FIG. 1C is a schematic diagram of a host system and a memory storage device illustrated according to an exemplary embodiment.

In general, the host system 1000 can be any system that can substantially store data with the memory storage device 100. Although the host system 1000 is described as a computer system in the present exemplary embodiment, in another exemplary embodiment of the present invention, the host system 1000 can be a system such as a digital camera, a video camera, a communication device, an audio player, or a video player. For instance, when the host system is a digital camera (video camera) 1310, the rewritable non-volatile memory storage device is an SD card 1312, an MMC card 1314, a memory stick 1316, a CF card 1318, or an embedded storage device 1320 (as shown in FIG. 1C) used by the digital camera (video camera) 1310. The embedded storage device 1320 includes an embedded MMC (eMMC). It should be mentioned that the eMMC is directly coupled to a substrate of the host system.

Figure 2:
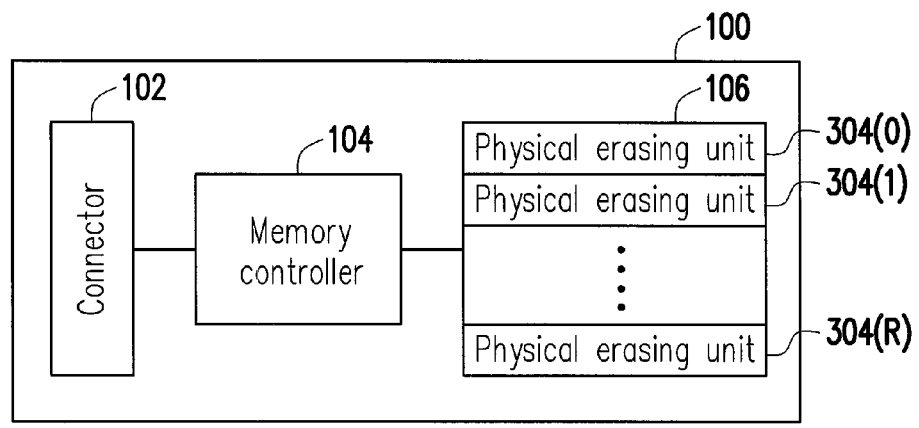
FIG. 2 is a schematic block diagram illustrating the memory storage device shown in FIG. 1A.

FIG. 2 is a schematic block diagram illustrating the memory storage device shown in FIG. 1A.

Referring to FIG. 2, the memory storage device 100 includes a connector 102, a memory controller 104, and a rewritable non-volatile memory module 106.

In the present exemplary embodiment, the connector 102 is compatible with the serial advanced technology attachment (SATA) standard. However, it should be understood that, the present invention is not limited thereto, and the connector 102 can also satisfy the parallel advanced technology attachment (PATA) standard, Institute of Electrical and Electronic Engineers (IEEE) 1394 standard, peripheral component interconnect express (PCI express) interface standard, universal serial bus (USB) standard, secure digital (SD) interface standard, Ultra High Speed-I (UHS-I) interface standard, Ultra High Speed-II (UHS-II) interface standard, memory stick (MS) interface standard, multi media card (MMC) interface standard, embedded multimedia card (eMMC) interface standard, Universal Flash Storage (UFS) interface standard, compact flash (CF) interface standard, integrated device electronics (IDE) interface standard, or other suitable standards.

The memory controller 104 is configured to execute a plurality of logic gates or control commands implemented in a hardware form or in a firmware form. The memory controller 104 also performs data operations such as writing, reading, and erasing in the rewritable non-volatile memory storage module 106 according to the commands of the host 1000.

The rewritable non-volatile memory module 106 is coupled to the memory controller 104 and is configured to store data written by the host system 1000. The rewritable non-volatile memory module 106 has physical erasing units 304(0)-304(R). For instance, the physical erasing units 304(0)-304(R) can belong to the same memory die or different memory dies. Each of the physical erasing units has a plurality of physical programming units, and physical programming units belonging to the same physical erasing unit can be independently written and erased at the same time. For instance, each of the physical erasing units is formed by 128 physical programming units. However, it should be understood that, the present invention is not limited thereto. Each of the physical erasing units can be formed by 64 physical programming units, 256 physical programming units, or any other number of physical programming units.

Figure 3:
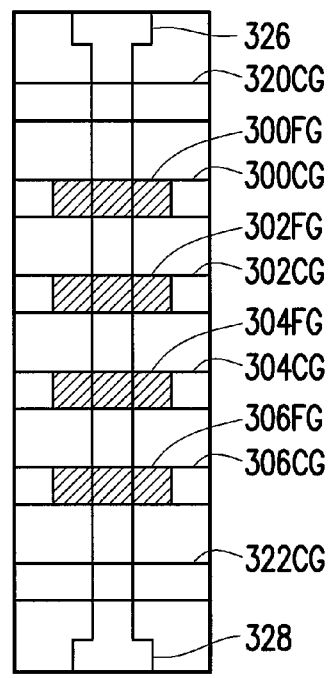
FIG. 3 is a top view of a NAND string illustrated according to an exemplary embodiment.
Figure 4:
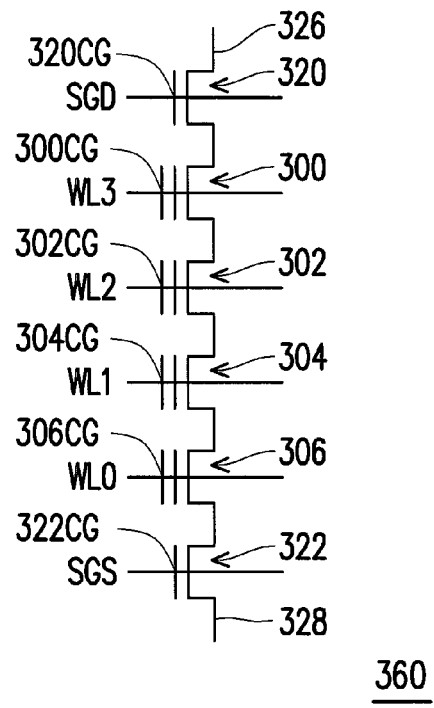
FIG. 4 is an equivalent circuit diagram of a NAND string illustrated according to an exemplary embodiment.

Using the NAND flash memory as an example, a physical erasing unit includes a plurality of NAND strings. Each of the NAND strings includes a plurality of transistors connected in series with one another. FIG. 3 is a top view of a NAND string illustrated according to an exemplary embodiment. FIG. 4 is an equivalent circuit diagram of a NAND string illustrated according to an exemplary embodiment. Referring to FIG. 3 and FIG. 4, a NAND string 360 includes transistors 320, 300, 302, 304, 306, and 322. The transistor 320 couples the NAND string 360 to a contact point 326 and the transistor 322 couples the NAND string 360 to a contact point 328. The line between the contact point 326 and the contact point 328 can also be referred to as a bit line. A control gate 320CG is coupled to a selection wire SGD and the transistor 320 can be controlled by applying the voltage on the control gate 320CG. A control gate 322CG is coupled to a selection wire SGS and the transistor 322 can be controlled by applying the voltage on the control gate 322CG. Each of the transistors 300, 302, 304, and 306 has a control gate and a floating gate. The voltage applied to the control gate can be configured to control the corresponding transistors 300, 302, 304, and 306, and the floating gate can be configured to store one or a plurality of bits. For instance, the transistor 300 has a control gate 300CG and a floating gate 300FG; the transistor 302 has a control gate 302CG and a floating gate 302FG; the transistor 304 has a control gate 304CG and a floating gate 304FG; and the transistor 306 has a control gate 306CG and a floating gate 306FG. The control gate 300CG is coupled to a word line WL3, the control gate 302CG is coupled to a word line WL2, the control gate 304CG is coupled to a word line WL1, and the control gate 306CG is coupled to a word line WL0. Herein, the transistors 300, 302, 304, and 306 are also referred to as memory cells.

Figure 5:
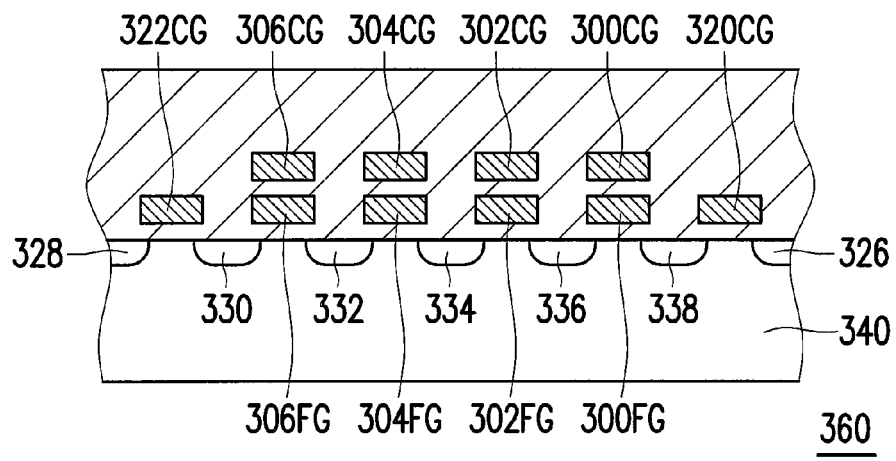
FIG. 5 is a side view of a NAND string illustrated according to an exemplary embodiment.

FIG. 5 is a side view of a NAND string illustrated according to an exemplary embodiment. Referring to FIG. 5, the NAND string 360 is disposed on the substrate 340. The control gates 300CG, 302CG, 304CG, and 306CG are respectively disposed on the floating gates 300FG, 302FG, 304FG, and 306FG. A dielectric layer is disposed between the control gates 300CG, 302CG, 304CG, and 306CG and the floating gates 300FG, 302FG, 304FG, and 306FG. An oxide layer is disposed between the floating gates 300FG, 302FG, 304FG, and 306GFG and the substrate 340. Adjacent memory cells share doped polysilicon layers 330, 332, 334, 336, and 338, and a polysilicon layer forms the source or the drain of a memory cell. For instance, the polysilicon layer 332 is the drain of the transistor 306 and the source of the transistor 304; the polysilicon layer 334 is the drain of the transistor 304 and the source of the transistor 302; the polysilicon layer 336 is the drain of the transistor 302 and the source of the transistor 300 . . . etc. When an electron or a hole is injected into the floating gate 300FG, 302FG, 304FG, or 306FG, the threshold voltage of the corresponding transistor is changed, and therefore one or a plurality of bits can be equivalently stored. It should be mentioned that, in other exemplary embodiments, the NAND string 360 can also include more memory cells. The present invention does not limit the number of memory cells in a NAND string.

Figure 6:
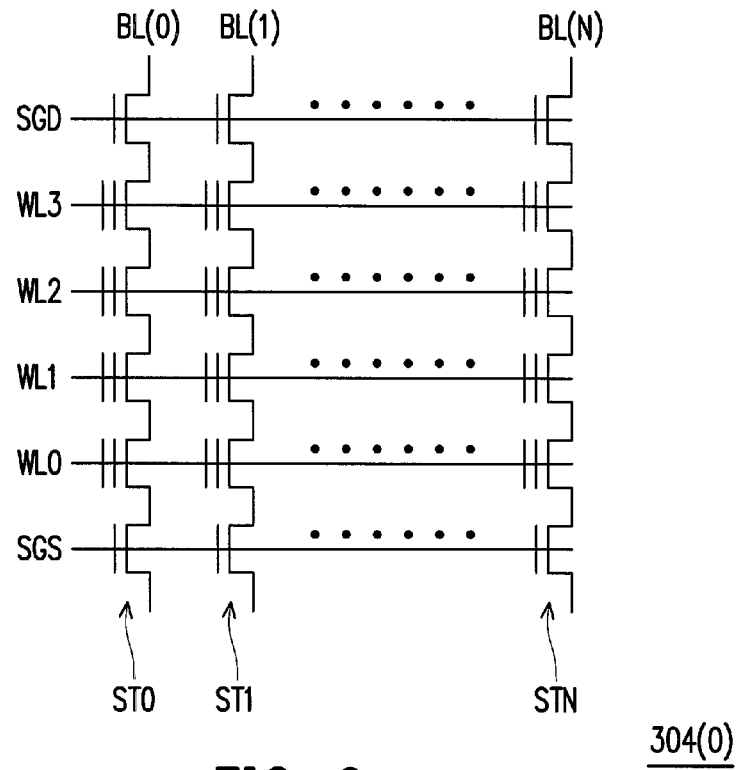
FIG. 6 is a schematic diagram of a physical erasing unit illustrated according to an exemplary embodiment.

FIG. 6 is a schematic diagram of a physical erasing unit illustrated according to an exemplary embodiment.

Referring to FIG. 6, using the physical erasing unit 304(0) as an example, the physical erasing unit 304(0) includes a plurality of NAND strings ST0-STN. The physical erasing unit 304(0) also includes the word lines WL0-WL3 and bit lines BL(0)-BL(N). Each of the memory cells in the physical erasing unit 304(0) is located on a word line and a bit line. A plurality of memory cells on the same word line form one or a plurality of physical programming units. Specifically, if each of the memory cells can store x bits, then the plurality of memory cells on the same word line form x physical programming units, wherein x is a positive integer. If the positive integer x is greater than 1, then the x physical programming units on the same word line can further be categorized as lower physical programming units and upper physical programming units. However, the present invention does not limit the value of the positive integer x. In general, the physical erasing unit is the smallest unit of erasing. That is, each of the physical erasing units contains the smallest number of memory cells that are erased together. In an exemplary embodiment, the physical erasing unit can also be referred to as a physical block and the physical programming unit can also be referred to as a physical page or a physical sector.

In the present exemplary embodiment, the rewritable non-volatile memory module 106 is a multi level cell (MLC) NAND flash memory module. That is, a memory cell can store at least 2 bits. However, the present invention is not limited thereto, and the rewritable non-volatile memory module 106 can also be a single level cell (SLC) NAND flash memory module, a trinary level cell (TLC) NAND flash memory module, other flash memory modules, or other memory modules having the same features. Alternatively, in an exemplary embodiment, the rewritable non-volatile memory module 106 can be a three-dimensional NAND flash memory module. Those having ordinary skill in the art should understand the configuration of the word lines and the bit lines in a three-dimensional NAND flash memory module, and the configuration is therefore not repeated herein.

Figure 7:
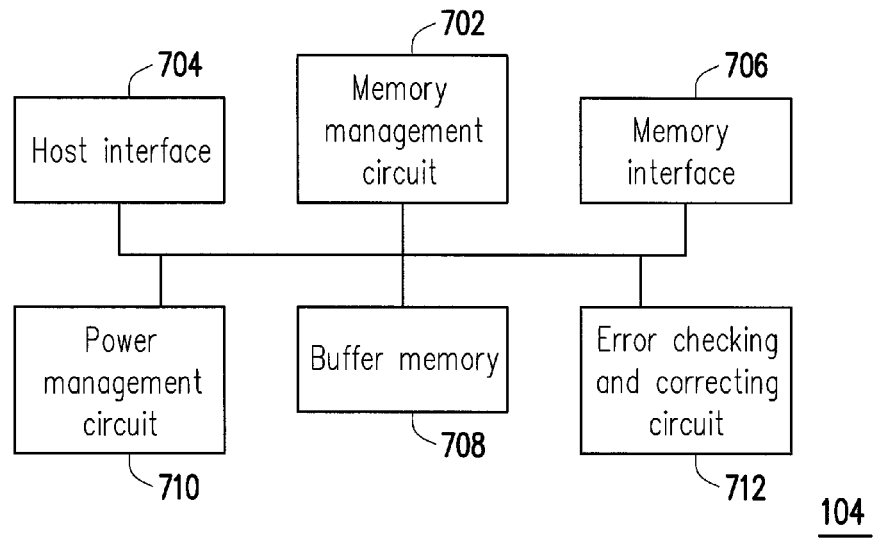
FIG. 7 is a schematic block diagram of a memory controller illustrated according to an exemplary embodiment.

FIG. 7 is a schematic block diagram of a memory controller illustrated according to an exemplary embodiment.

Referring to FIG. 7, the memory controller 104 includes a memory management circuit 702, a host interface 704, and a memory interface 706.

The memory management circuit 702 is configured to control the overall operation of the memory controller 104. Specifically, the memory management circuit 702 has a plurality of control commands. During the operation of the memory storage device 100, the control commands are executed to perform various data operations such as writing, reading, and erasing.

The host interface 704 is coupled to the memory management circuit 702 and is configured to receive and identify commands and data sent from the host system 1000. Namely, the commands and data sent from the host system 1000 are transmitted to the memory management circuit 702 through the host interface 704. In the present exemplary embodiment, the host interface 704 is compatible with the SATA standard. However, it should be understood that the present invention is not limited thereto, and the host interface 704 can also be compatible with the PATA standard, IEEE 1394 standard, PCI Express standard, USB standard, SD standard, UHS-I standard, UHS-II standard, MS standard, MMC standard, eMMC standard, UFS standard, CF standard, IDE standard, or other suitable standards for data transmission.

The memory interface 706 is coupled to the memory management circuit 702 and is configured to access the rewritable non-volatile memory module 106. In other words, data to be written to the rewritable non-volatile memory module 106 is converted to a format acceptable to the rewritable non-volatile memory module 106 through the memory interface 706.

In an exemplary embodiment of the present invention, the memory controller 104 further includes a buffer memory 708, a power management circuit 710, and an error checking and correcting circuit 712.

The buffer memory 708 is coupled to the memory management circuit 702 and is configured to temporarily store data or commands from the host system 1000 or data from the rewritable non-volatile memory module 106.

The power management circuit 710 is coupled to the memory management circuit 702 and is configured to control the power of the memory storage device 100.

The error checking and correcting circuit 712 is coupled to the memory management circuit 702 and is configured to execute an error checking and correcting process to ensure the correctness of data. Specifically, when the memory management circuit 702 receives a writing command from the host system 1000, the error checking and correcting circuit 712 generates an error correcting code (ECC) for the data corresponding to the writing command, and the memory management circuit 702 writes the data corresponding to the writing command and the corresponding ECC into the rewritable non-volatile memory module 106. Next, when reading data from the rewritable non-volatile memory module 106, the memory management circuit 702 also reads the ECC corresponding to the data, and the error checking and correcting circuit 712 executes an error checking and correcting process on the read data according to the ECC.

The type of the ECC can be a parity checking code, a channel coding, or other types. For instance, the generated ECC can be the operation result of an exclusive or (XOR), a hamming code, a low density parity check code (LDPC code), a turbo code, or a Reed-Solomon code (RS code), but the present invention is not limited thereto. If the length ratio of the data to the error correcting code is m:n, then the data having a length of m corresponds to the ECC having a length of n, wherein m and n are positive integers. The present invention also does not limit the value of each of the positive integer m and the positive integer n.

In the present exemplary embodiment, the error checking and correcting circuit 712 generates the ECC according to data stored in the first memory cells in the physical erasing unit. The first memory cells are located on first word lines and first bit lines. Specifically, on each of the first bit lines, only one of the memory cells stores the data used to generate a first ECC. In this way, if an error occurs when writing the data into a physical programming unit and the error also affects the other memory cells on the same bit/word line, then the first ECC can be configured to correct the error. The different states of generating the first ECC are explained in the following through a plurality of exemplary embodiments.

Figure 8:
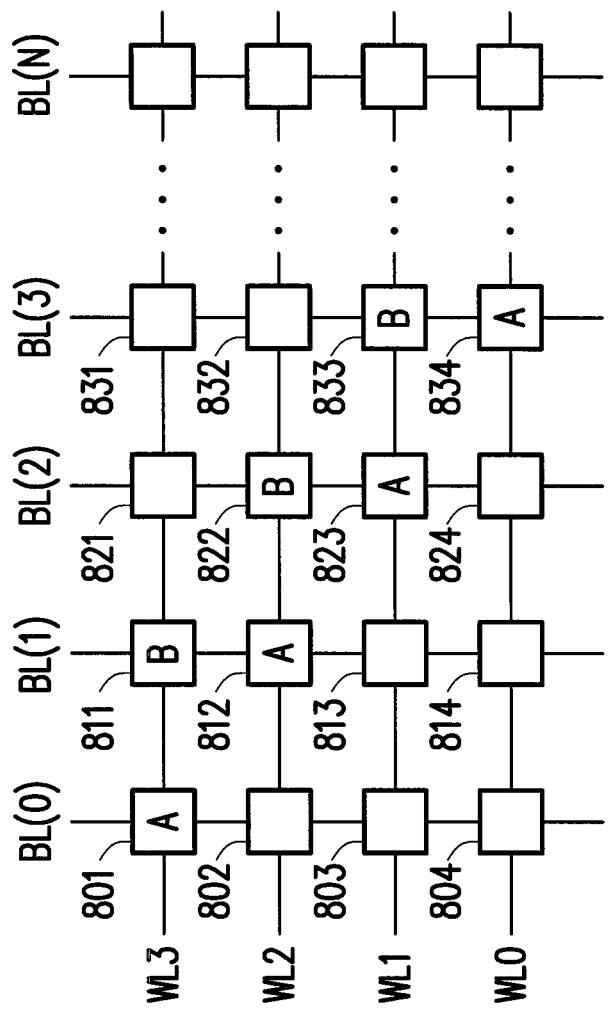
FIG. 8 is a schematic diagram of generating a first error correcting code illustrated according to an exemplary embodiment.

FIG. 8 is a schematic diagram of generating a first ECC illustrated according to an exemplary embodiment.

Referring to FIG. 8, the memory cells 801-804, 811-814, 821-824, and 831-834 are used as examples. For simplification, the selecting gate, floating gate, and control gate are not illustrated in FIG. 8. In the present exemplary embodiment, the error checking and correcting circuit 712 generates the first ECC at least according to the data (labeled as "A") stored in the memory cells 801, 812, 823 and 834. The memory cells 801, 812, 823, and 834 are located on the bit lines BL(0)-BL(3) (also referred to as the first bit lines) and the word lines WL0-WL3 (also referred to as the first word lines). It should be mentioned that, on each of the bit lines BL(0)-BL(3), only one memory cell stores the data used to generate the first ECC. For instance, on the bit line BL(0), only the memory cell 801 stores the data used to generate the first ECC. Similarly, on the bit line BL(1), only the memory cell 812 stores the data used to generate the first ECC. In this way, when a programming error occurs, the first ECC can have better correcting ability. For instance, there is data being stored in the lower physical programming unit in the word line WL2. Suppose a programming error occurs when writing data into the upper physical programming unit corresponding to the word line WL2 and the error occurs to the memory cell 812. In this situation, an error may occur to the data originally stored in the memory cell 812, and an error may also occur to the data in the memory cells 811 and 813 located on the same bit line BL(1). However, for the first ECC, the possible error only affects bits stored in one memory cell, and therefore the first ECC can correct the error in the memory cell 812.

In an exemplary embodiment, the error checking and correcting circuit 712 generates a second ECC at least according to the data (labeled as "B") stored in memory cells 811, 822, and 833. In particular, the memory cells 811, 822, and 833 are located on the bit lines BL(1)-BL(3) (also referred to as the second bit lines) and the word lines WL1-WL3 (also referred to as the second word lines). On each of the second bit lines BL(1)-BL(3), only one of the memory cells stores the data used to generate the second ECC. For instance, on the bit line BL(1), only the memory cell 811 stores the data used to generate the second ECC. Similarly, on the bit line BL(2), only the memory cell 822 stores the data used to generate the second ECC. In the present exemplary embodiment, the memory cell 811 and the memory cell 801 are located on the same word line WL3 and are respectively located on the two adjacent bit lines BL(1) and BL(0). Moreover, the memory cell 811 and the memory cell 812 are located on the same bit line BL(1) and are respectively located on the two adjacent word lines WL3 and WL2. The second ECC is different from the first ECC. The second ECC is configured to correct the error in the memory cells 811, 822, and 833. In an exemplary embodiment, the error checking and correcting circuit 712 generates a corresponding ECC for the data in all of the memory cells.

Figure 9:
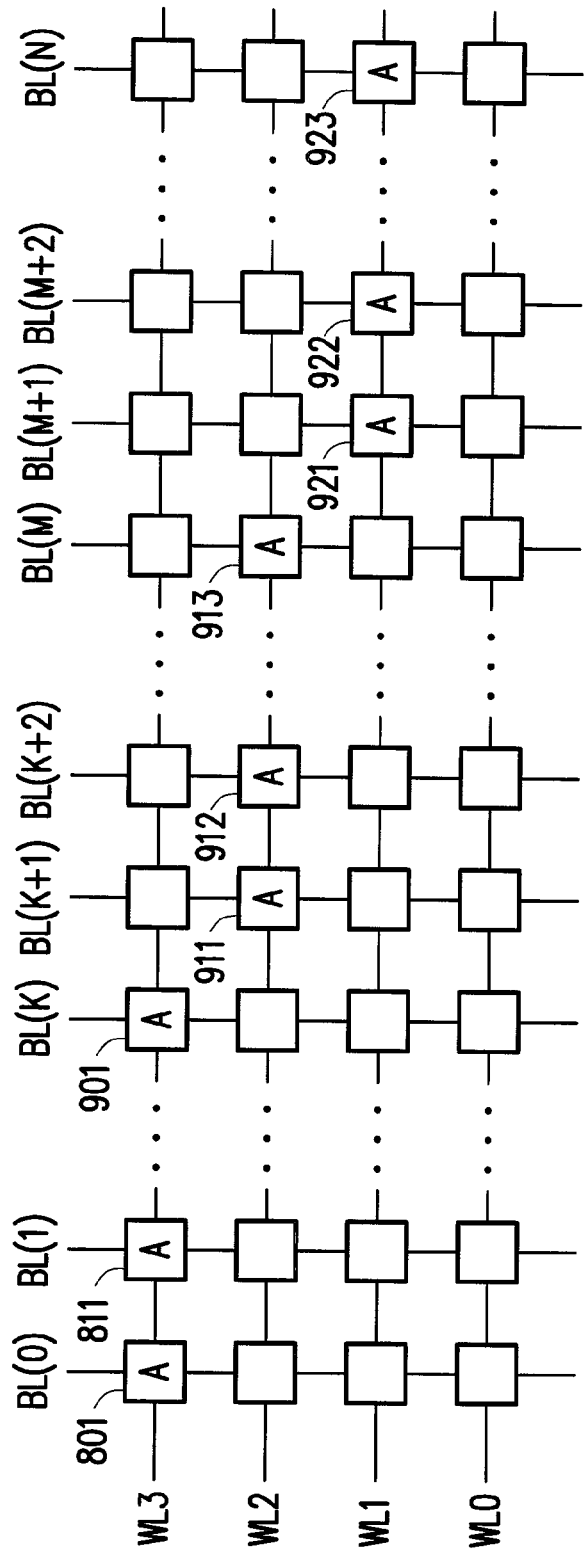
FIG. 9-FIG. 11 are schematic diagrams of generating a first error correcting code illustrated according to an exemplary embodiment.
Figure 10:
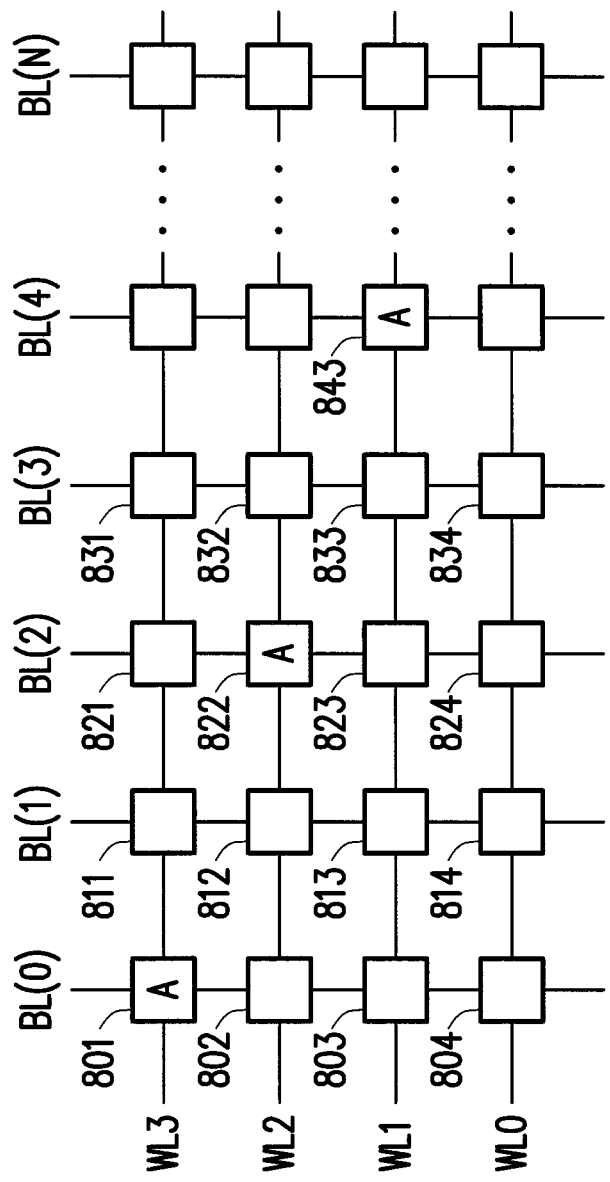
Figure 11:
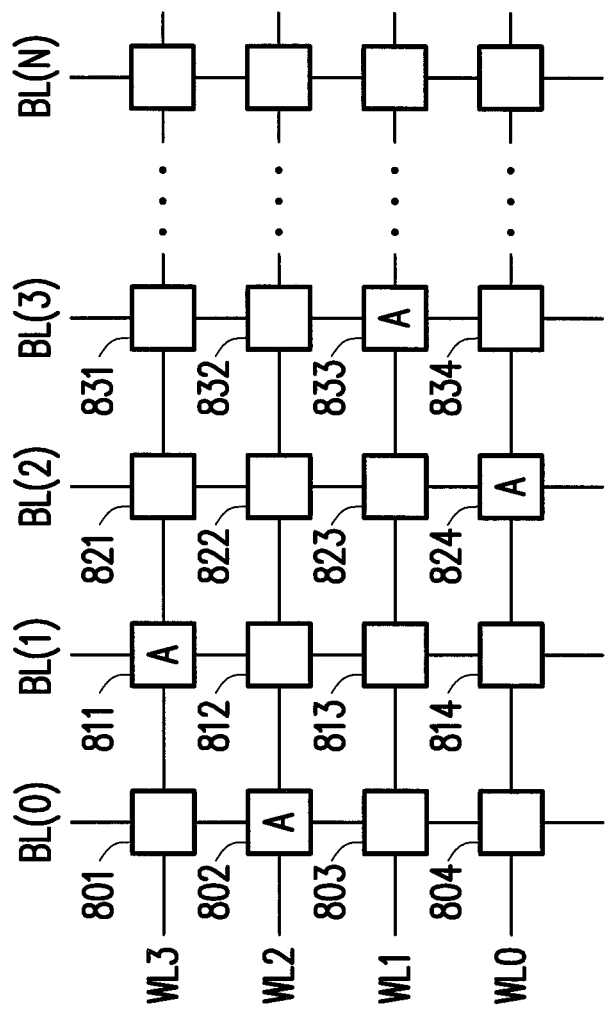

FIG. 9-FIG. 11 are schematic diagrams of generating a first error correcting code illustrated according to an exemplary embodiment.

Referring to FIG. 9, in the exemplary embodiment of FIG. 9, the error checking and correcting circuit 712 generates the first ECC using data stored in the plurality of memory cells on the word lines. For instance, the error checking and correcting circuit 712 generates the first ECC using the data in the memory cells 801 and 811 to the memory cell 901, the data in the memory cells 911 and 912 to the memory cell 913, and the data in the memory cells 921 and 922 to the memory cell 923. It should be mentioned that, on each of the bit lines BL(0)-BL(N), only one of the memory cells stores the data used to generate the first ECC. In the present exemplary embodiment, the error checking and correcting circuit 712 obtains the same amount of data (for instance, 1 k byte) from each of the word lines, that is, the size of the data stored in the memory cells 801 and 811 to the memory cell 901 is 1 k byte and the size of the data stored in the memory cells 911-913 is also 1 k byte. In the present exemplary embodiment, the smallest protecting unit of the first ECC is 1 k byte and the smallest protecting unit can also be referred to as a symbol. That is, the error checking and correcting circuit 712 obtains data having the same size as the smallest protecting unit from each of the word lines. However, the size of the smallest protecting unit changes according to different ECCs. In other words, the present invention is not limited to generate the first ECC by obtaining an amount of data from each of the word lines. Alternatively, for different word lines, the error checking and correcting circuit 712 may also generate the first ECC by obtaining different amounts of data.

Referring to FIG. 10, in the exemplary embodiment of FIG. 10, the error checking and correcting circuit 712 generates the first ECC at least according to the data stored in the memory cell 801, the memory cell 822, and the memory cell 843. It should be mentioned that, the bit line BL(0) on which the memory cell 801 is located and the bit line BL(2) on which the memory cell 822 is located are separated by a bit line. Moreover, the bit line BL(2) on which the memory cell 822 is located and the bit line BL(4) on which the memory cell 843 is located are separated by a bit line. However, in another exemplary embodiment, the error checking and correcting circuit 712 may also generate the first ECC by obtaining data from memory cells located on different word lines separated by two or more bit lines.

In another exemplary embodiment, the error checking and correcting circuit 712 generates the first ECC at least according to the data stored in the memory cell 801 and the memory cell 813. It should be mentioned that, the word line WL3 on which the memory cell 801 is located and the word line WL1 on which the memory cell 813 is located are separated by a word line. However, in another exemplary embodiment, the error checking and correcting circuit 712 may also generate the first ECC by obtaining data from memory cells located on different bit lines separated by two or more word lines.

Referring to FIG. 11, in the exemplary embodiment of FIG. 11, the error checking and correcting circuit 712 generates the first ECC at least according to the data stored in the memory cells 802, 811, 824, and 833. Alternatively, in another exemplary embodiment, the error checking and correcting circuit 712 can also generate the first ECC according to the data stored in the memory cells 804, 813, 822, and 831. In other words, the present invention does not limit the location of the memory cell used to generate the first ECC (or the second ECC).

After the error checking and correcting circuit 712 generates the first ECC (or the second ECC), the memory management circuit 710 writes the generated ECC into one of the physical erasing units 304(0)-304(R). In an exemplary embodiment, the error checking and correcting circuit 712 generates the ECC by obtaining the data from the physical erasing unit 304(0), and the memory management circuit 710 writes the generated ECC into the same physical erasing unit 304(0). However, in another exemplary embodiment, the memory management circuit 710 can also write the ECC into another physical erasing unit, and the present invention is not limited thereto.

In an exemplary embodiment, a physical programming unit includes a data bit region and a redundant bit region. Memory cells in the data bit region are configured to store user data. Memory cells in the redundant bit region are configured to store system data. If the error checking and correcting circuit 712 generates the first ECC according to the data in the data bit region in a plurality of first physical programming units, then the error checking and correcting circuit 712 stores the generated first ECC in the first physical programming units in a distributed manner. For instance, referring again to FIG. 9, the error checking and correcting circuit 712 obtains data from the physical programming units corresponding to the word lines WL1-WL3, and therefore the error checking and correcting circuit 712 divides the generated first ECC into three parts. One of the parts is stored in the physical programming unit (for instance, the redundant bit region) corresponding to the word line WL1 and the other two parts are respectively stored in the physical programming units (for instance, the redundant bit regions) corresponding to the word lines WL2 and WL3. Alternatively, in another exemplary embodiment, the generated first ECC can also be entirely stored in one physical programming unit, and the present invention is not limited thereto. Alternatively, in another exemplary embodiment, the generated first ECC is distributed in the data bit regions of a plurality of physical programming units, and the present invention is not limited thereto.

In the present exemplary embodiment, the ECC is generated by the error checking and correcting circuit 712. However, in another exemplary embodiment, the ECC can also be generated by the memory management circuit 710. For instance, the operation of the error checking and correcting circuit 712 can be implemented as a plurality of program codes, and the program codes are executed by the memory management circuit 710. An exemplary embodiment of the present invention provides a data protecting method. The data protecting method includes the operation of the error checking and correcting circuit 712 or the steps formed by the program codes. The implement of the data protecting method of the present invention is not limited to the use of hardware or software.

Based on the above, the data protecting method, the memory storage device, and the memory controller provided by the exemplary embodiments of the present invention generate the first ECC according to data stored in memory cells located on different bit lines and different word lines. In this way, when an error occurs to a number of memory cells in a physical programming unit and the error affects the other memory cells on the same bit line (or word line), then the first ECC can be configured to correct the error.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data protecting method for controlling a rewritable non-volatile memory module, wherein the rewritable non-volatile memory module comprises a plurality of word lines, a plurality of bit lines, and a plurality of memory cells, each of the memory cells is located on one of the word lines and one of the bit lines, and the memory cells form a plurality of physical erasing units, the data protecting method comprising:

storing data into a plurality of first memory cells of the memory cells, wherein the first memory cells are located on a plurality of first word lines of the word lines and a plurality of first bit lines of the bit lines; and generating, by an error checking and correcting circuit, a first error correcting code by using first data of the data stored in the first memory cells, wherein the first data is only stored in one memory cell of each of the first bit lines among the first memory cells.

2. The method of claim 1, further comprising:

obtaining the first data stored in the only one memory cell of each of the first bit lines among the first memory cells, wherein the first word lines are separated from each other by at least one third word line among the word lines.

3. The method of claim 1, further comprising:
obtaining the first data stored in the only one memory cell of each of the first bit lines among the first memory cells, wherein the first bit lines are separated from each other by at least one third bit line.

4. The method of claim 1, further comprising:
generating, by the error checking and correcting circuit, a second error correcting code by using second data of data stored in a plurality of second memory cells of the memory cells, wherein the second memory cells are located on a plurality of second word lines of the word lines and a plurality of second bit lines of the bit lines,
wherein the second data is only stored in one memory cell of each of the second bit lines among the second memory cells.

5. The method of claim 4, wherein one of the second bit lines is the same as one of the first bit lines.

6. The method of claim 4, wherein one of the second word lines is the same as one of the first word lines.

7. The method of claim 1, further comprising:
storing the first error correcting code in one of the physical erasing units.

8. The method of claim 1, further comprising:
dividing the first error correcting code into a plurality of parts, storing one of the parts in a physical programming unit corresponding to one of the first word lines; and
storing another one of the parts in a physical programming unit corresponding to another one of the first word lines.

9. A memory storage device, comprising:
a connector, configured to be coupled to a host system;
a rewritable non-volatile memory module, comprising a plurality of word lines, a plurality of bit lines, and a plurality of memory cells, wherein each of the memory cells is located on one of the word lines and one of the bit lines, and the memory cells form a plurality of physical erasing units; and
a memory controller, coupled to the connector and the rewritable non-volatile memory module, and configured to store data into a plurality of first memory cells of the memory cells and to generate a first error correcting code by using first data of the data stored in the first memory cells of the memory cells, wherein the first memory cells are located on a plurality of first word lines of the word lines and a plurality of first bit lines of the bit lines,
wherein the first data is only stored in one memory cell of each of the first bit lines among the first memory cells.

10. The memory storage device of claim 9, wherein the first word lines are separated from each other by at least one third word line among the word lines.

11. The memory storage device of claim 9, wherein the first bit lines are separated from each other by at least one third bit line among the bit lines.

12. The memory storage device of claim 9, wherein the memory controller is further configured to generate a second error correcting code by using second data of data stored in a plurality of second memory cells of the memory cells, wherein the second memory cells are located on a plurality of second word lines of the word lines and a plurality of second bit lines of the bit lines,
wherein the second data is only stored in one memory cell of each of the second bit lines among the second memory cells.

13. The memory storage device of claim 12, wherein one of the second bit lines is the same as one of the first bit lines.

14. The memory storage device of claim 12, wherein one of the second word lines is the same as one of the first word lines.

15. The memory storage device of claim 9, wherein the memory controller is further configured to store the first error correcting code in one of the physical erasing units.

16. The memory storage device of claim 9, wherein the memory controller is further configured to divide the first error correcting code into a plurality of parts, store one of the parts in a physical programming unit corresponding to one of the first word lines, and store another one of the parts in a physical programming unit corresponding to another one of the first word lines.

17. A memory controller for controlling a rewritable non-volatile memory module, wherein the rewritable non-volatile memory module comprises a plurality of word lines, a plurality of bit lines, and a plurality of memory cells, each of the memory cells is located on one of the word lines and one of the bit lines, and the memory cells form a plurality of physical erasing units, the memory controller comprising:
a host interface, configured to be coupled to a host system;
a memory interface, configured to be coupled to the rewritable non-volatile memory module; and
an error checking and correcting circuit, configured to generate a first error correcting code by using first data of data stored in a plurality of first memory cells of the memory cells, wherein the first memory cells are located on a plurality of first word lines of the word lines and a plurality of first bit lines of the bit lines,
wherein the first data is only stored in one memory cell of each of the first bit lines among the first memory cells.

18. The memory controller of claim 17, wherein the first word lines are separated from each other by at least one third word line among the word lines.

19. The memory controller of claim 17, wherein the first bit lines are separated from each other by at least one third bit line among the bit lines.

20. The memory controller of claim 17, wherein the error checking and correcting circuit is further configured to generate a second error correcting code by using second data of data stored in a plurality of second memory cells of the memory cells, wherein the second memory cells are located on a plurality of second word lines of the word lines and a plurality of second bit lines of the bit lines,
wherein the second data is only stored in one memory cell of each of the second bit lines among the second memory cells.

21. The memory controller of claim 20, wherein one of the second bit lines is the same as one of the first bit lines.

22. The memory controller of claim 21, wherein one of the second word lines is the same as one of the first word lines.

23. The memory controller of claim 17, further comprising:
a memory management circuit, configured to store the first error correcting code in one of the physical erasing units.

24. The memory controller of claim 17, further comprising:
a memory management circuit, configured to divide the first error correcting code into a plurality of parts, store one of the parts in a physical programming unit corresponding to one of the first word lines, and store another one of the parts in a physical programming unit corresponding to another one of the first word lines.

* * * * *